United States Patent
Prosser et al.

(10) Patent No.: US 7,395,591 B2
(45) Date of Patent: Jul. 8, 2008

(54) METHODS FOR MODIFYING TRUCK CABS AND DOORS

(75) Inventors: Jerry R. Prosser, Blythewood, SC (US); Jeffrey P. Hurey, Sidney, OH (US)

(73) Assignee: Fontaine Modification Company, Charlotte, NC (US)

( * ) Notice: Subject to any disclaimer, the term of this patent is extended or adjusted under 35 U.S.C. 154(b) by 122 days.

(21) Appl. No.: 11/083,574

(22) Filed: Mar. 18, 2005

(65) Prior Publication Data

US 2006/0208536 A1 Sep. 21, 2006

(51) Int. Cl.
*B21K 21/16* (2006.01)
(52) U.S. Cl. ...................................... 29/401.1
(58) Field of Classification Search .............. 29/401.1, 29/402.01, 402.03; 296/190.08; 180/89.12
See application file for complete search history.

(56) References Cited

U.S. PATENT DOCUMENTS

| | | | | |
|---|---|---|---|---|
| 4,497,748 A | * | 2/1985 | Vitus et al. | 260/665 R |
| 4,683,678 A | * | 8/1987 | Cummings et al. | 49/426 |
| 5,033,567 A | * | 7/1991 | Washburn et al. | 180/89.12 |

OTHER PUBLICATIONS

Mini Truck Magazine (Sep. 2001) http://www.minitruckinweb.com/tech/0109mt_1989_to_1995_toyota_4_inch_roof_chop/photo_03.html.*
Mini Truck Magazine (Sep. 2001) http://www.minitruckinweb.com/tech/0109mt_1989_to_1995_toyota_4_inch_roof_chop/photo_03.html, 37 pages.
First Declaration of Jerry R. Prosser under 37 C.F.R. 1.132 (1 page), dated May 10, 2005.
Second Declaration of Jerry R. Prosser under 37 C.F.R. 1.132, and Exhibit A cited therein (9 pages), dated May 10, 2005.

* cited by examiner

*Primary Examiner*—John C Hong
(74) *Attorney, Agent, or Firm*—Myers Bigel Sibley & Sajovec, P.A.

(57) ABSTRACT

A method is provided for modifying a cab assembly of a Class 5 or higher truck. The cab assembly includes a cab. The cab has an original cab height from a cab bottom end to a cab top end thereof. The cab includes a bottom region, a window region located above the bottom region, a roof region located above the window region, and a window defined in the window region. The method includes: cutting the cab through the window region to divide the cab into a top section and a bottom section; and thereafter joining the top section or a replacement top section to the bottom section to form a modified cab, wherein the modified cab has a modified height from the cab bottom end to the cab top end that is less than the original cab height.

19 Claims, 12 Drawing Sheets

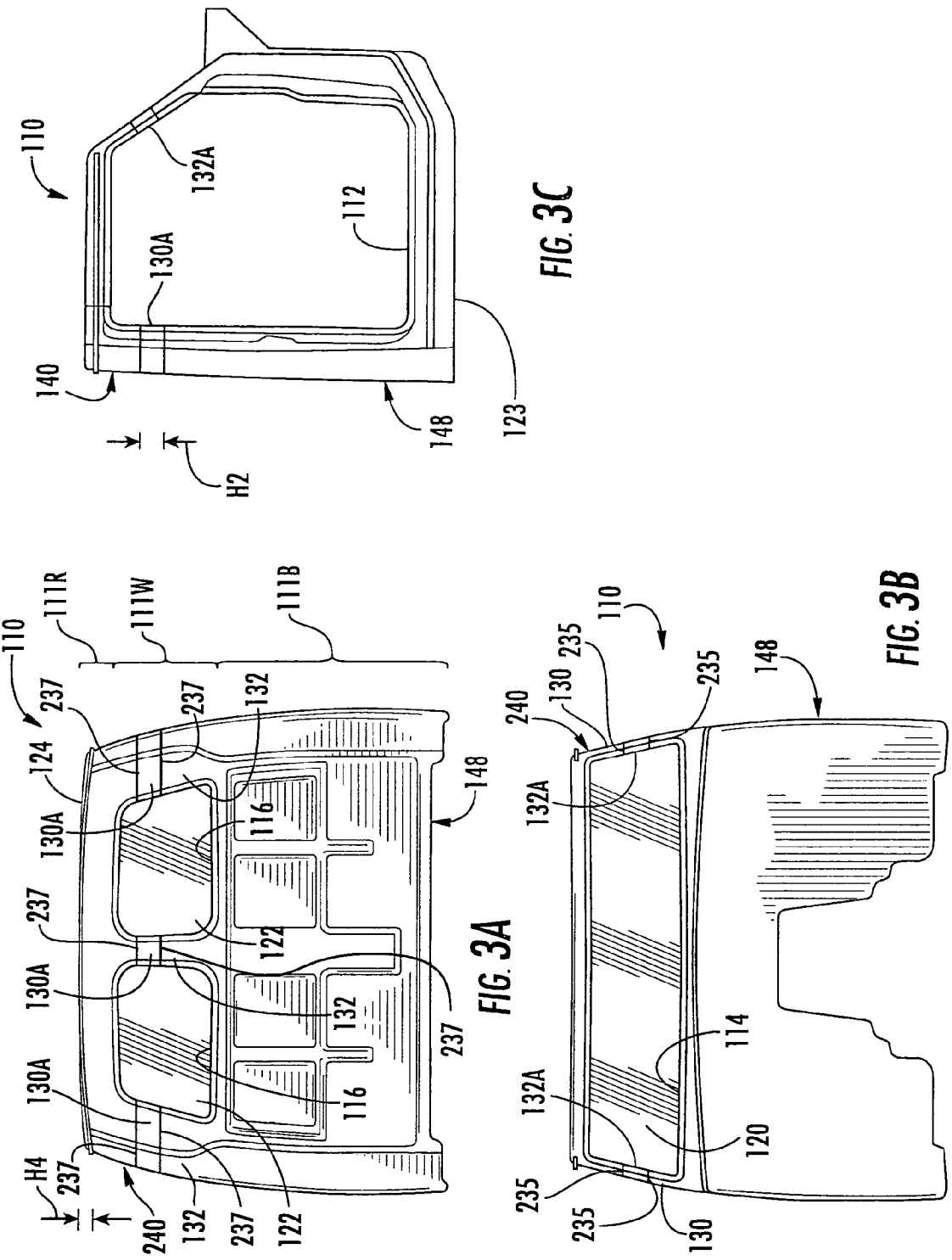

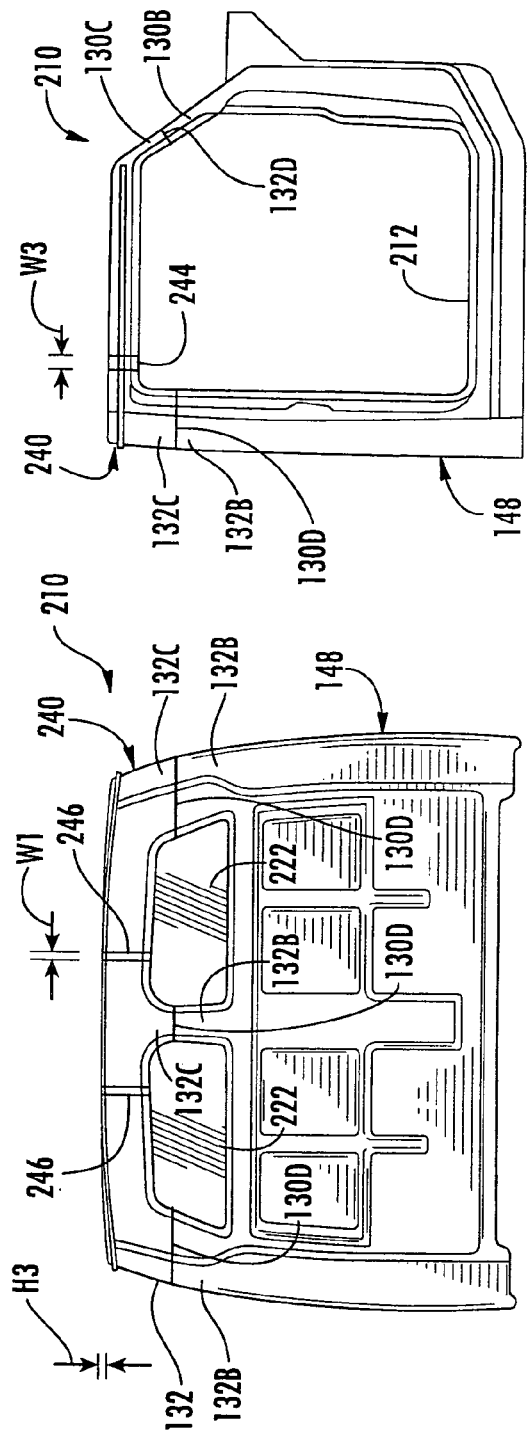
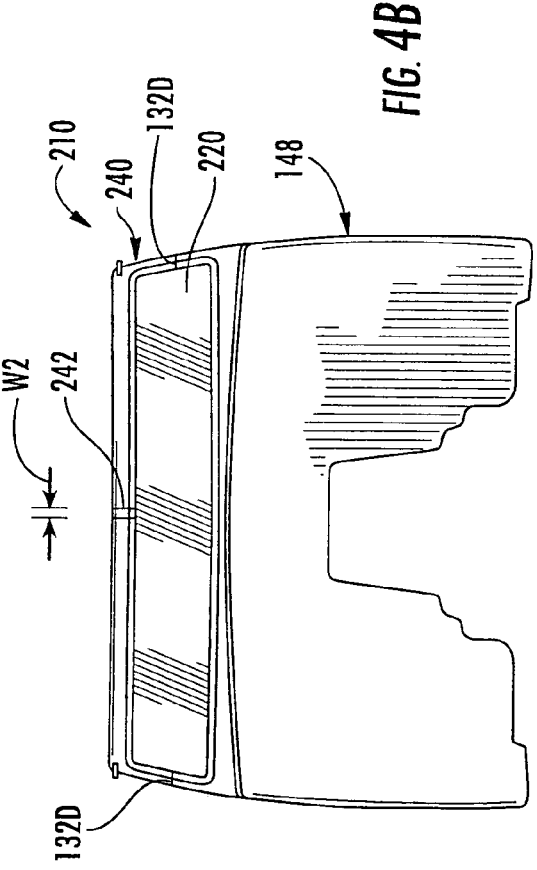
FIG. 4A
FIG. 4B
FIG. 4C

METHODS FOR MODIFYING TRUCK CABS AND DOORS

FIELD OF THE INVENTION

The present invention relates to large trucks and, more particularly, to modified large trucks and methods for modifying large trucks.

BACKGROUND OF THE INVENTION

Large trucks may be provided by an original manufacturer having certain dimensions, including a standard cab height dimension. A manufacturer may wish to offer the truck or an owner of such a truck may wish to use the truck as a vocational truck such as an automobile hauler, a utility truck or the like. In some cases, the truck can not be readily put to such use because the standard cab height does not provide for sufficient overhead clearance for a body structure, vocational equipment or the like.

SUMMARY OF THE INVENTION

According to embodiments of the present invention, a method is provided for modifying a cab assembly of a Class 5 or higher truck. The cab assembly includes a cab. The cab has an original cab height from a cab bottom end to a cab top end thereof. The cab includes a bottom region, a window region located above the bottom region, a roof region located above the window region, and a window defined in the window region. The method includes: cutting the cab through the window region to divide the cab into a top section and a bottom section; and thereafter joining the top section or a replacement top section to the bottom section to form a modified cab, wherein the modified cab has a modified height from the cab bottom end to the cab top end that is less than the original cab height.

According to further embodiments of the present invention, a method is provided for modifying a vehicle door. The door has an original door height from a door bottom end to a door top end thereof. The door includes a door bottom region, a door window region located above the door bottom region, a door top region located above the door window region, and a door window defined in the window region. The method includes: cutting the door through the door window region to divide the door into a door top section and a door bottom section; removing the door top section from the door bottom section; and thereafter mounting a door member on the door bottom section such that a portion of the door member overlaps the door bottom section to form a modified door. The modified door has a modified door height from the door bottom end to the door top end that is less than the original door height.

According to further embodiments of the present invention, a method is provided for modifying a vehicle door. The door has an original door height from a door bottom end to a door top end thereof. The door includes a door bottom region, a door window region located above the door bottom region, a door top region located above the door window region, and a door window defined in the window region. The method includes: cutting the door through the door window region to divide the door into a door top section and a door bottom section; removing the door top section from the door bottom section; and thereafter mounting a door member on the door bottom section to form a modified door. The modified door has a modified door height from the door bottom end to the door top end that is less than the original door height. The vehicle is a Class 5 or higher truck.

According to further embodiments of the present invention, a vehicle door includes a door bottom section and a door member. The door member is mounted on the door bottom section such that a portion of the door member overlaps the door bottom section. The door bottom section and the door member define a door window therebetween.

Further features, advantages and details of the present invention will be appreciated by those of ordinary skill in the art from a reading of the figures and the detailed description of the preferred embodiments that follow, such description being merely illustrative of the present invention.

BRIEF DESCRIPTION OF THE DRAWINGS

FIG. 3A is a rear view of a cab of the truck of FIG. 1, including scribe lines formed therein in accordance with embodiments of the present invention.

FIG. 3B is a front view of the cab of FIG. 3A.

FIG. 3C is a side view of the cab of FIG. 3A.

FIG. 4A is a rear view of the cab of FIG. 3A wherein the cab has been converted to a modified cab in accordance with embodiments of the present invention.

FIG. 4B is a front view of the modified cab of FIG. 4A.

FIG. 4C is a side view of the modified cab of FIG. 4A.

DETAILED DESCRIPTION OF THE DRAWINGS

Figure 2:
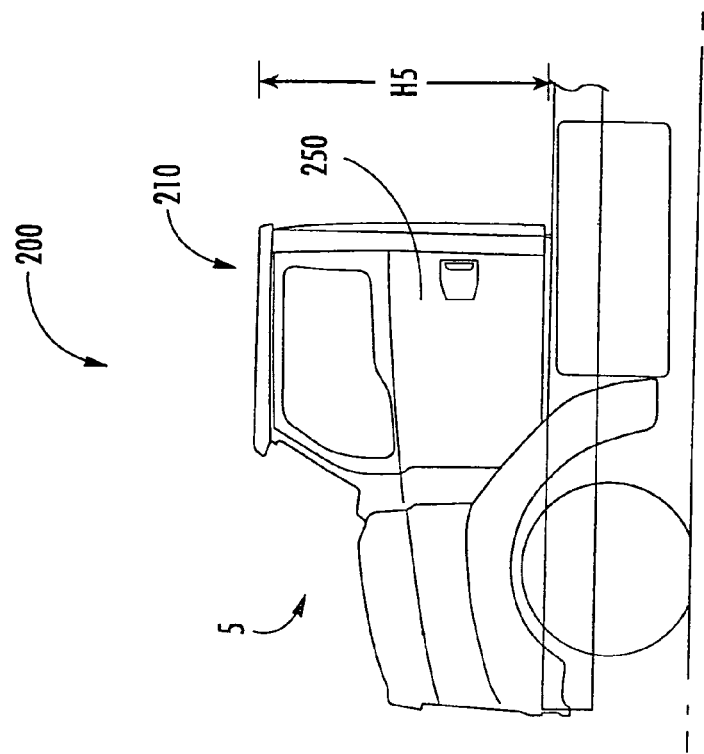
FIG. 2 is a fragmentary, right side view of a truck including a modified cab in accordance with embodiments of the present invention.

The present invention now is described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

Like numbers refer to like elements throughout. In the figures, the thickness of certain lines, layers, components, elements or features may be exaggerated for clarity. Broken lines illustrate optional features or operations unless specified otherwise.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

It will be understood that when an element is referred to as being "on", "attached" to, "connected" to, "coupled" with, "contacting", etc., another element, it can be directly on, attached to, connected to, coupled with or contacting the other element or intervening elements may also be present. In contrast, when an element is referred to as being, for example, "directly on", "directly attached" to, "directly connected" to, "directly coupled" with or "directly contacting" another element, there are no intervening elements present. It will also be appreciated by those of skill in the art that references to a structure or feature that is disposed "adjacent" another feature may have portions that overlap or underlie the adjacent feature.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention. The sequence of operations (or steps) is not limited to the order presented in the claims or figures unless specifically indicated otherwise.

As used herein, the term "window" includes a windshield opening.

As used herein, "large truck" includes trucks (including heavy trucks) and truck-tractors.

As used herein, "Class 5", "Class 8" and the like refer to the classifications of Gross Vehicle Weight rating Classes as set forth in United States Code of Federal Regulations Title 49—Transportation, Chapter 5, Section 565.6, Table II (37 CFR Section 565).

Figure 1:
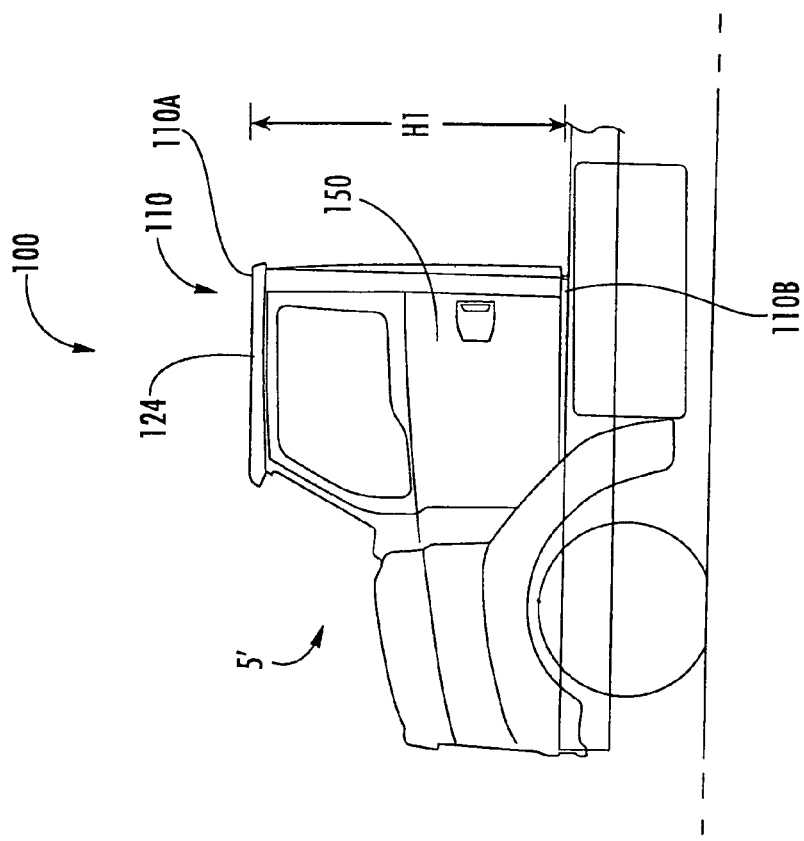
FIG. 1 is a fragmentary, right side view of a truck of the prior art.
Figure 5:
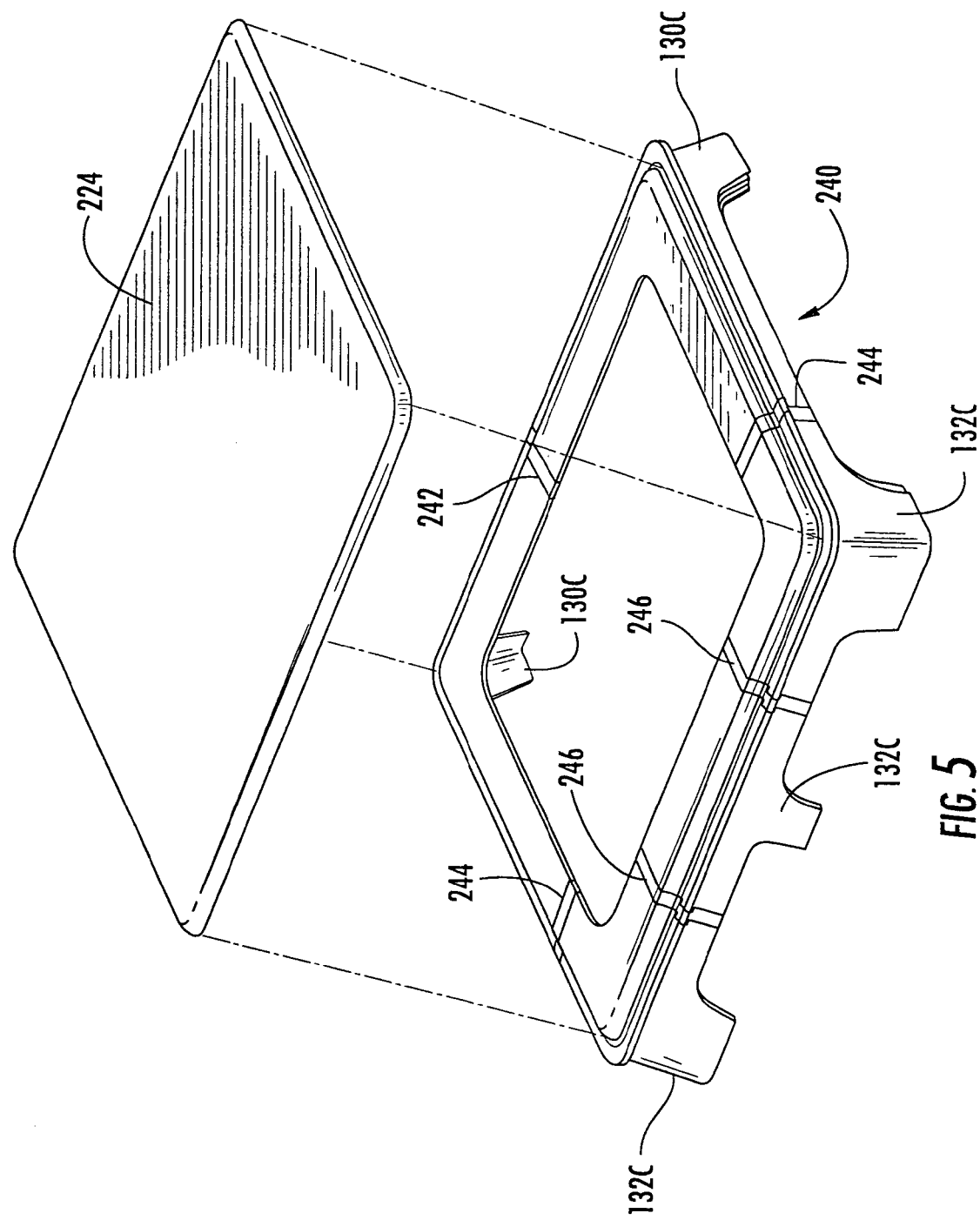
FIG. 5 is a rear perspective view of a modified top section and roof panel of the modified cab of FIG. 4A.

In accordance with embodiments of the present invention, a cab of a large truck or truck-tractor can be modified to reduce its height as measured from its topmost end to its bottommost end (e.g., from its floor structure to the top of its roof). For example, a large truck cab assembly 100 as shown in FIG. 1 can be converted to a modified large truck cab assembly 200 as shown in FIGS. 2 and 11-15. The conversion may include modification to doors 150 of the cab assembly 100 to convert them to modified doors 250 of the modified cab assembly 200.

Exemplary methods in accordance with the present invention for modifying a large truck cab will now be described. It will appreciated that various of the steps and techniques can be omitted or modified in keeping with embodiments of the present invention.

The large truck cab assembly 100 is first provided. According to some embodiments, the large truck cab assembly 100 is a cab assembly of a large truck 5' rated as Class 5 or higher. According to some embodiments, the large truck cab assembly 100 is a cab assembly of a large truck rated as Class 8 or higher. Suitable and contemplated large trucks include the those manufactured by Sterling Truck Corporation (Freightliner, L.L.C.) of Ohio.

The cab assembly 100 includes a cab 110. Referring to FIG. 1, the cab 110 has a height H1 extending from a top end 110A to a bottom end 110B. The top end 110A is defined by the topmost extent of a roof panel 124. The bottom end 110B is defined by the bottommost extent of a floor structure 123 (FIG. 3C). As indicated in FIG. 3A, the cab 110 has a roof region 111R, a window region 111W, and a bottom region 111B. Door openings 112 (FIG. 3C), a windshield opening 114 (FIG. 3B), and rear window openings 116 (FIG. 3A) are defined in the window region 111W of the cab 110. In the window region 111W, the cab 110 tapers in the direction from the bottom region 111B to the roof region 111R.

The cab 110 may be initially stabilized and leveled. For example, the cab 110 may be secured to a fixed base using brackets. The cab 110 is stripped. For example, various trim, mechanicals, etc. may be removed. Rear window glass panels 122, a windshield glass panel 120 and any other glass panels are also removed from the cab assembly 100. The doors 150 are removed. As discussed in more detail below, the doors 150 may be modified.

The roof panel 124 of the cab assembly 100 is removed from the cab 110. Depending on how the roof panel 124 is attached, the roof panel 124 may be cut off and/or released from the remainder of the cab 110 by removing fasteners (e.g., rivets).

A plurality of scribe lines are then formed at selected locations on the cab 110, as follows and as shown in FIGS. 3A-3C. Scribe lines 237 are formed in the window region 110W in rear posts 132. Scribe lines 235 are formed in the window region 110W in windshield posts 130. The scribe lines 235, 237 are generally horizontal and parallel to one another. The scribe lines 235, 237 define removal sections 130A, 132A therebetween. The scribe lines 235, 237 also define an upper or a top section 140 above the removal sections 130A, 132A and a lower or bottom section 148 below the removal sections 130A, 132A. According to some embodiments, each section 130A, 132A has a height H2 (FIG. 3C) of at least about 2 inches. According to some embodiments, the height H2 is in the range from about 2 to 9 inches. According to some embodiments, the height H2 is in the range from about 3.75 to 4.75 inches.

According to some embodiments, a suitable holding fixture such as an X-brace is installed in the cab 110 prior to cutting (as discussed below). According to some embodiments, the X-brace is installed such that a first cross member thereof extends from the left, rear post 132 to the right, front post 130, and a second cross member extends from the right, rear post 132 to the left, front post 130. The holding fixture can serve to prevent undesirable collapse or splaying of the cab 110 once the posts 130, 132 are cut.

The cab 110 is then cut along (or inwardly of) the scribe lines 235, 237 fully through the posts 130, 132. According to some embodiments, rigid bracing pieces such as lengths of angled metal railing are tack-welded over or behind the scribe lines 235, 237 to hold the top section 140 and the sections 130A, 132A in place until all of the cuts have been made. The railings can then be removed after the cuts have been made. The sections 130A, 132A are then removed. If the cuts are made inwardly of (away from) the scribe lines 235, 237, a finished grind may be executed to grind the post stubs 130B, 132B and the post stubs 130C, 132C to the scribe lines 235, 237.

The top section 140 is then cut fully through at five locations: over the center of the windshield opening 114, over each door opening 112, and over each of the window openings 116. The pieces formed thereby are separated and filler strips or pieces 242, 244 and 246 are then welded in place along each of these cuts as shown in FIGS. 4A-4C and 5. In this manner, the top section 140 is re-formed as a modified top section 240. The modified top section 240 has an increased width and length as compared to the original top section 140. According to some embodiments, the filler pieces 246 have a width W1 (FIG. 4A) of between about 0.5 and 1.5 inches. According to some embodiments, the filler pieces 242 have a width W2 (FIG. 4B) of between about 1 and 2 inches. According to some embodiments, the filler pieces 244 have a width W3 (FIG. 4C) of between about 1.5 and 2.5 inches.

The modified top section 240 is then welded to the lower cab section 148 as shown in FIGS. 4A-4C. More particularly, the ends of the cab bottom section post stubs 130B and 132B are positioned on and welded to the ends of the post stubs 130C and 132C, respectively, to form joints 130D, 132D. It will be appreciated that, because the posts 130, 132 are convergingly tapered, the modification of the top section 140 with the cuts and filler pieces 242, 244, 246 serves to configure the top section 240 such that the post stubs 130C, 132C properly align and mate with the post stubs 130B, 132B. The welds may be seam welds.

Before or after securing the modified top section 240 to the cab bottom section 148, a new roof panel 224 is installed on the modified top section 240. The roof panel 224 may be welded, bonded and/or fastened (e.g., riveted) to the modified top section 240. The roof panel 224 is enlarged in length and width as compared to the original roof panel 124 to accommodate the increased dimensions of the top section 240 due to the filler pieces 242, 244, 246. According to some embodiments, the maximum height H3 (FIG. 4A) of the roof panel 224 is less than the corresponding maximum height H4 (FIG. 3A) of the roof panel 124. According to some embodiments, the height H3 is at least 2 inches less than the height H4. The roof panel 224 may be formed of any suitable material, such as a composite material or steel. Suitable composite materials may include fiberglass-reinforced plastic (FRP), sheet molded compound (SMC), bulk molded compound (BMC), structural reaction injection molding (SRIM), or thermoplastics.

The original doors 150 may be modified as described below. The modified original doors 250 or new doors configured to fit the modified cab 210 are reinstalled/installed in the modified door openings 212 (FIG. 4C).

A windshield glass panel 220 and rear window glass panels 222 are installed in the modified windshield opening 214 and the modified rear window openings 216. The windshield glass panel 220 and the rear window glass panels 222 may be new glass panels sized and shaped to fit the modified openings.

All appropriate trim, mechanicals, fixtures (e.g., seats), etc. are also reinstalled/installed in the modified cab 210. The modified cab assembly 200 may be finished and painted as desired. If the cab assembly 100 has been removed from a truck frame, the modified cab assembly 200 is remounted on the truck frame or mounted on another truck frame.

According to some embodiments, the truck 5 (FIG. 2) upon which the modified cab assembly 200 is mounted is a truck rated as Class 5 or higher. According to some embodiments, the truck having the modified cab assembly 200 is a truck rated as Class 8 or higher. According to some embodiments, the truck having the modified cab assembly 200 is thereafter used as a vocational truck. According to some embodiments, the truck having the modified cab assembly 200 is used or configured as an automobile hauler. According to some embodiments, the truck having the modified cab assembly 200 is thereafter used or configured as a utility vehicle.

According to some embodiments, the height H5 (FIG. 2) of the modified cab 210 is at least about 2 inches less than the height H1 (FIG. 1) of the cab 110. According to some embodiments, the height H5 is between about 2 and 9 inches less than the height H1. According to some embodiments, the height H5 is between about 6.0 and 6.5 inches less than the height H1.

Each of the doors 150 may be converted to a modified door 250 as follows. The modification procedure for each of the doors 150 may be the same and therefore only one will be described below.

Figure 6:
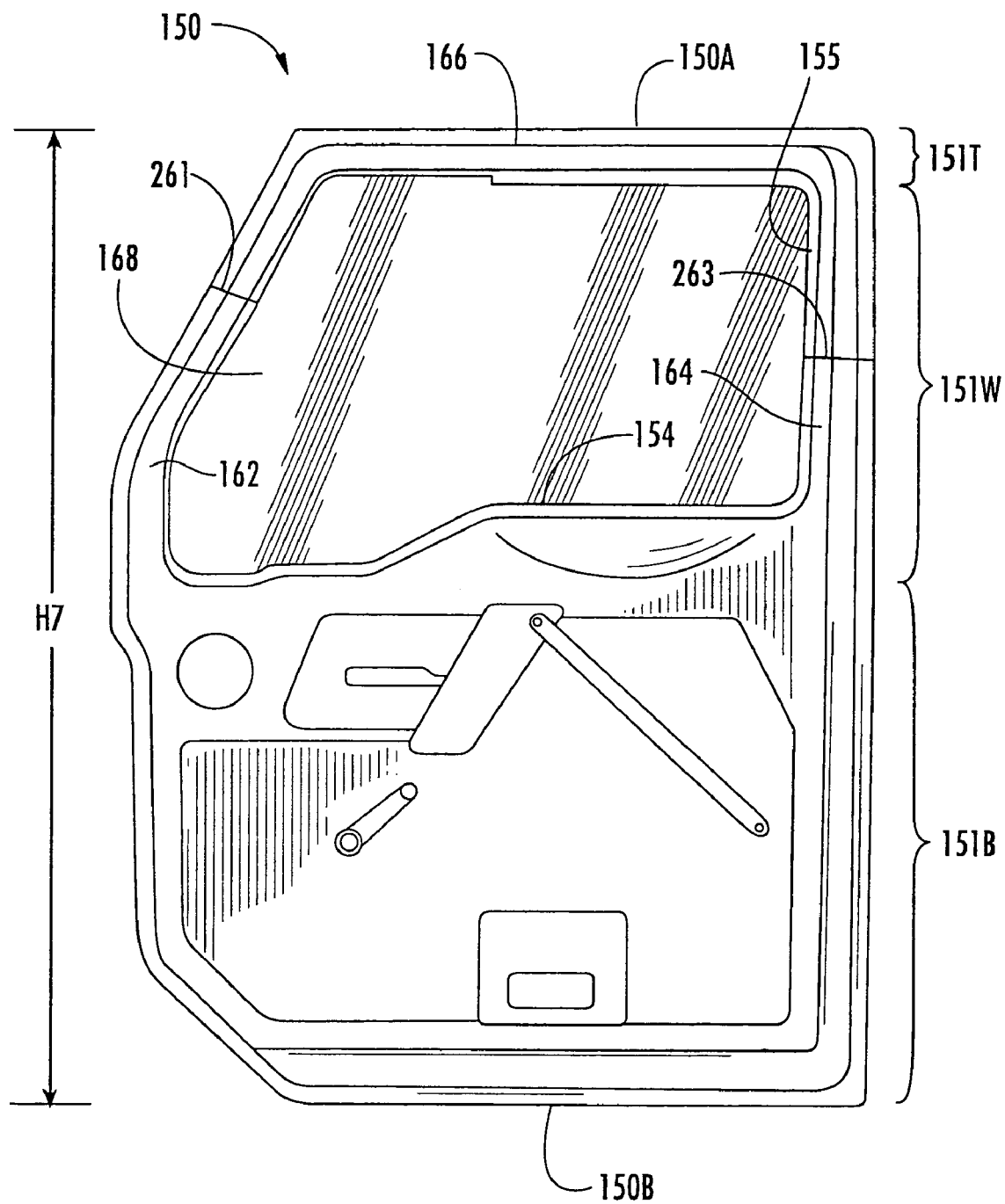
FIG. 6 is an inner side view of a door of the truck of FIG. 1 including scribe lines formed therein in accordance with embodiments of the present invention.

Referring to FIG. 6, the door 150 has a height H7 extending from a top end 150A to a bottom end 150B (FIG. 6). The top end 150A is defined by the topmost extent of a cross member 166. The bottom end 150B is defined by the bottommost edge of the door 150. With reference to FIG. 6, the door 150 has a top region 151T, a window region 151W, and a bottom region 151B. A window opening 154 is defined in the window region 151W of the door 150.

The original door 150 may be stripped of some or all trim and mechanicals. Window glass 168 is removed from the window opening 154.

Figure 7:
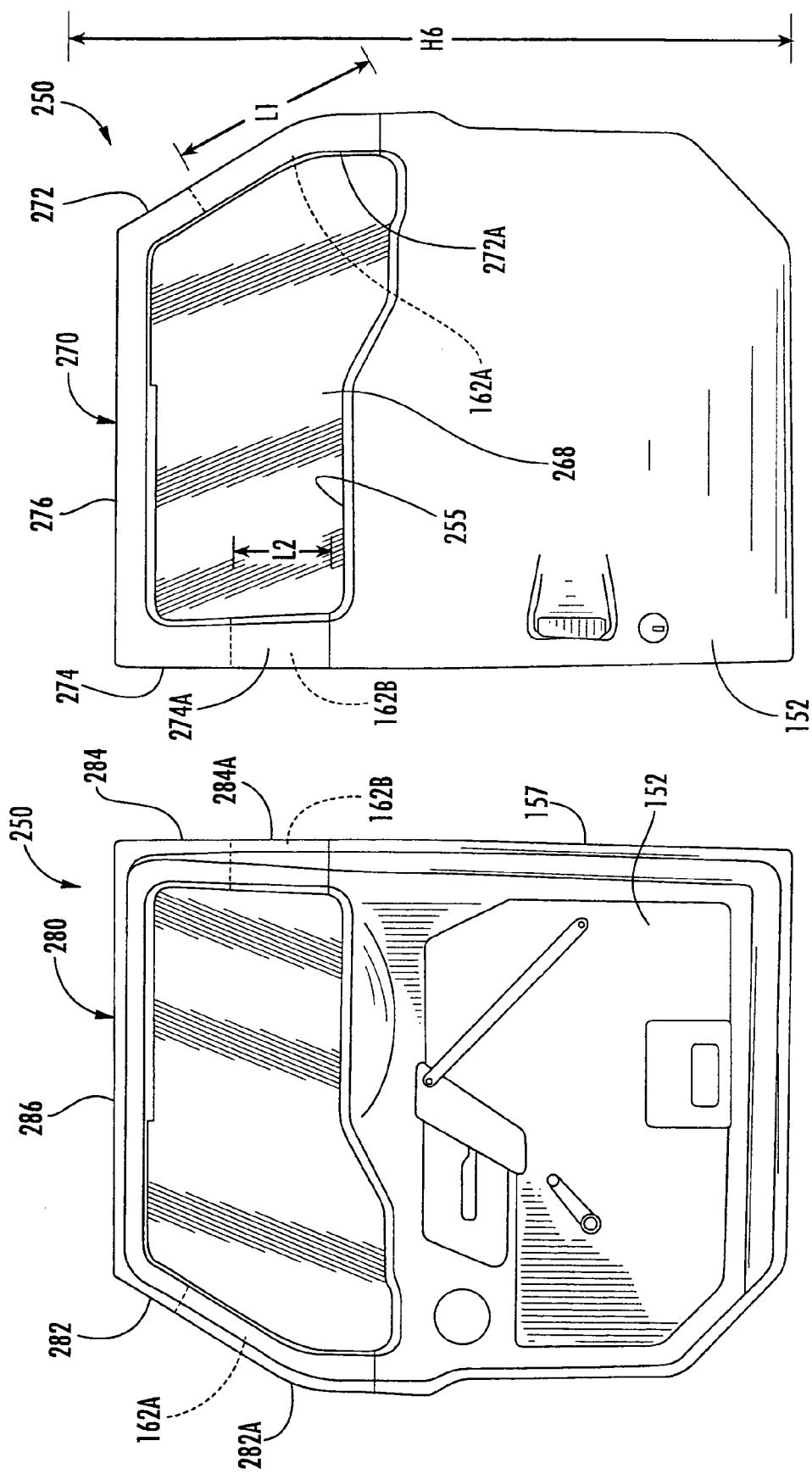
FIG. 7A is an inner side view of a modified door in accordance with embodiments of the present invention.
FIG. 7B is an outer side view of the modified door of FIG. 7A.
Figure 8:
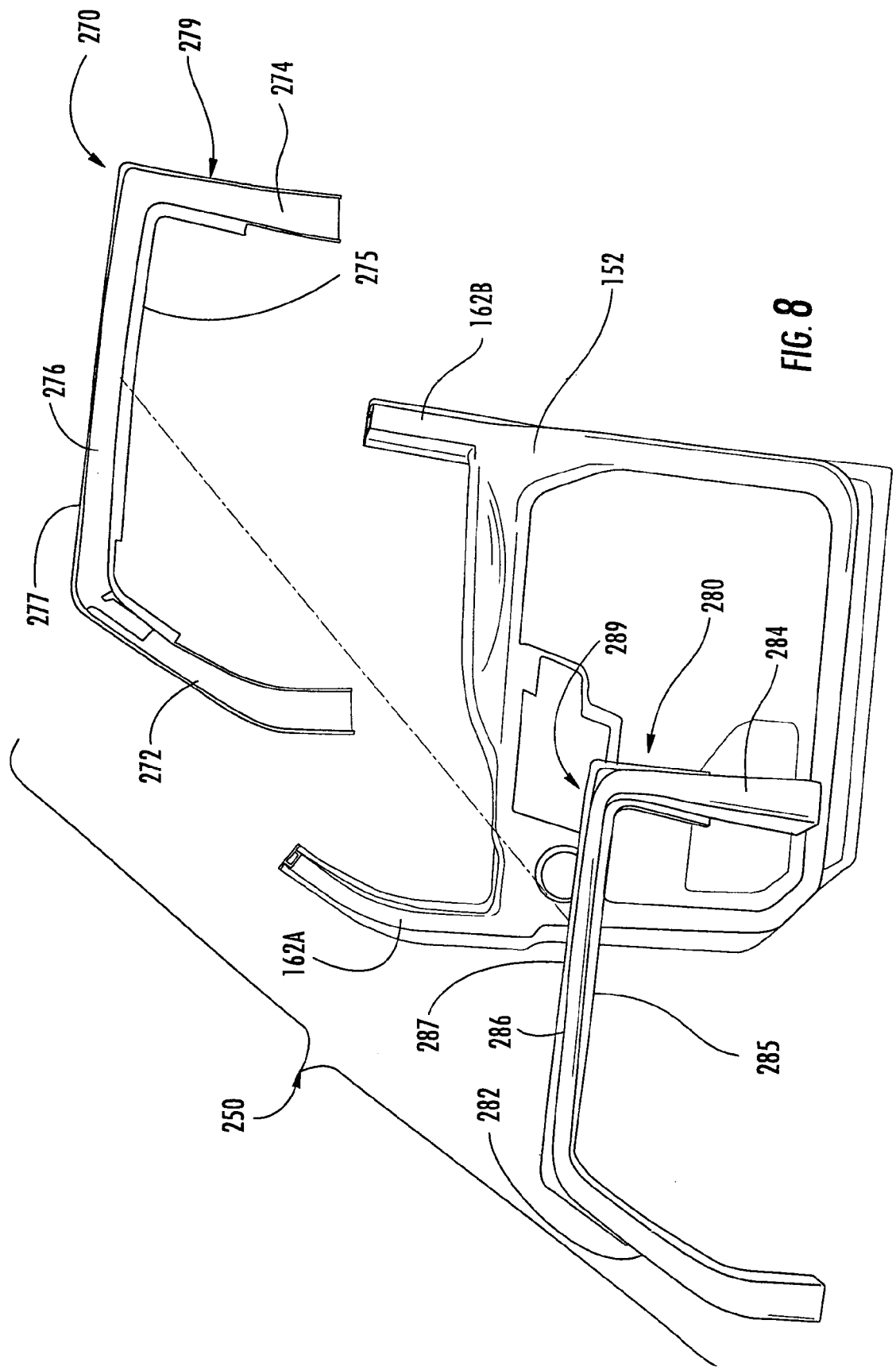
FIG. 8 is an exploded, rear perspective view of the modified door of FIG. 7A.

As shown in FIG. 6, scribe lines 261 and 263 are formed in the window region 151W in the front window post 162 and the rear window post 164. The door 150 is then cut fully through the posts 162, 164 along the scribe lines 261, 263. A top section 265 including the cross member 166 and parts of the posts 162, 164 is then removed from the door 150 so that the front post stub 162A and a rear post stub 164B remain on a door lower or bottom section 152 (FIGS. 7A, 7B and 8).

Thereafter, an outer replacement door member 270 and an inner replacement door member 280 are installed on the bottom section 152. The outer door member 270 includes a front section 272, a rear section 274 and a cross section 276. An integral inner flange 275 and an integral outer flange 277 extend about the inner and outer peripheries, respectively, of the outer door member 270. The door member 270 approximates or defines a channel 279. The inner door member 280 includes a front section 282, a rear section 284, and a cross section 286. An integral inner flange 285 and an integral outer flange 277 extend about the inner and outer peripheries, respectively, of the inner door member 280. The door member 280 approximates or defines a channel 289.

The outer door member 270 is mounted on the door section 152 such that portions 272A and 274A of the sections 272 and 274 overlap the front post stub 162A and the rear post stub 164A, respectively, and are received in the channels 279, 289. Similarly, the inner door member 280 is mounted on the door section 152 such that portions 282A and 284A of the sections 282 and 284 overlap the front post stub 162A and the rear post stub 164A, respectively, and are received in the channels 279, 289. In this manner, the door members 270, 280 cooperatively envelope the post stubs 162A, 164A. Some or all portions of the flanges 275, 277, 285, 287 mate with one another. The inner flanges 275, 285 form a continuation of the inner flanges 155 (FIG. 6) of the door section 152. The outer flanges 277, 287 similarly form a continuation of the outer flange 157 (FIG. 7A) of the door section 152.

According to some embodiments, the overlap distance L1 (FIG. 7B) between the portions 272A, 282A, and the post stubs 162A is between about 10 and 20 inches. According to some embodiments, the overlap distance L2 (FIG. 7B) between the portions 274A, 284A and the post stub 164B is between about 4 and 12 inches. According to some embodiments, the overlap distances L1 and L2 are each at least about 4 inches.

The door members 270 and 280 are secured to the door section 152 and to one another by adhesive, welds, fasteners (e.g., rivets, screws, etc.) and/or suitable means. According to some embodiments, the door members 270, 280 are secured to the door section 152 by one or more layers of adhesive between each overlap portion 272A, 274A, 282A, 284A and the facing surfaces of the post stubs 162A, 162B. According to some embodiments, the door members 270, 280 are secured to each other by one or more layers of adhesive between the interfacing surfaces of the door members 270 and 280. In this manner, the door section 152 and the door members 272, 280 are assembled as a rigid, integral structure. Any suitable adhesive may be used. Suitable adhesives include acrylic, cyanoacrylate, epoxy, and urethane adhesives.

The door members 270, 280 may be formed of any suitable material. According to some embodiments, the door members 270, 280 are formed of a composite material. According to some embodiments, the composite material is selected from the group consisting of FRP, SMC, BMC, SRIM, RTM, RTM LITE and thermoplastics. According to some embodiments, the door members 270, 280 are formed of FRP. According to some embodiments, the door members 270, 280 are each integrally and unitarily molded.

The modified door 250 thus formed will have a modified (reduced height) window opening 255. A window glass panel 268 sized to fit the opening 255 is installed in the modified door 250. The window glass panel 268 may be a new glass panel.

All appropriate trim, mechanicals, fixtures, etc. are installed/reinstalled in the modified door 250. The modified door 250 may be finished and painted as desired. The modified door 250 is mounted on the modified cab assembly 200.

According to some embodiments, the height H6 (FIG. 7B) of the modified door 250 is at least about 2 inches less than the height H7 (FIG. 6) of the door 150. According to some embodiments, the height H6 is between about 2 and 9 inches less than the height H7.

Figure 9:
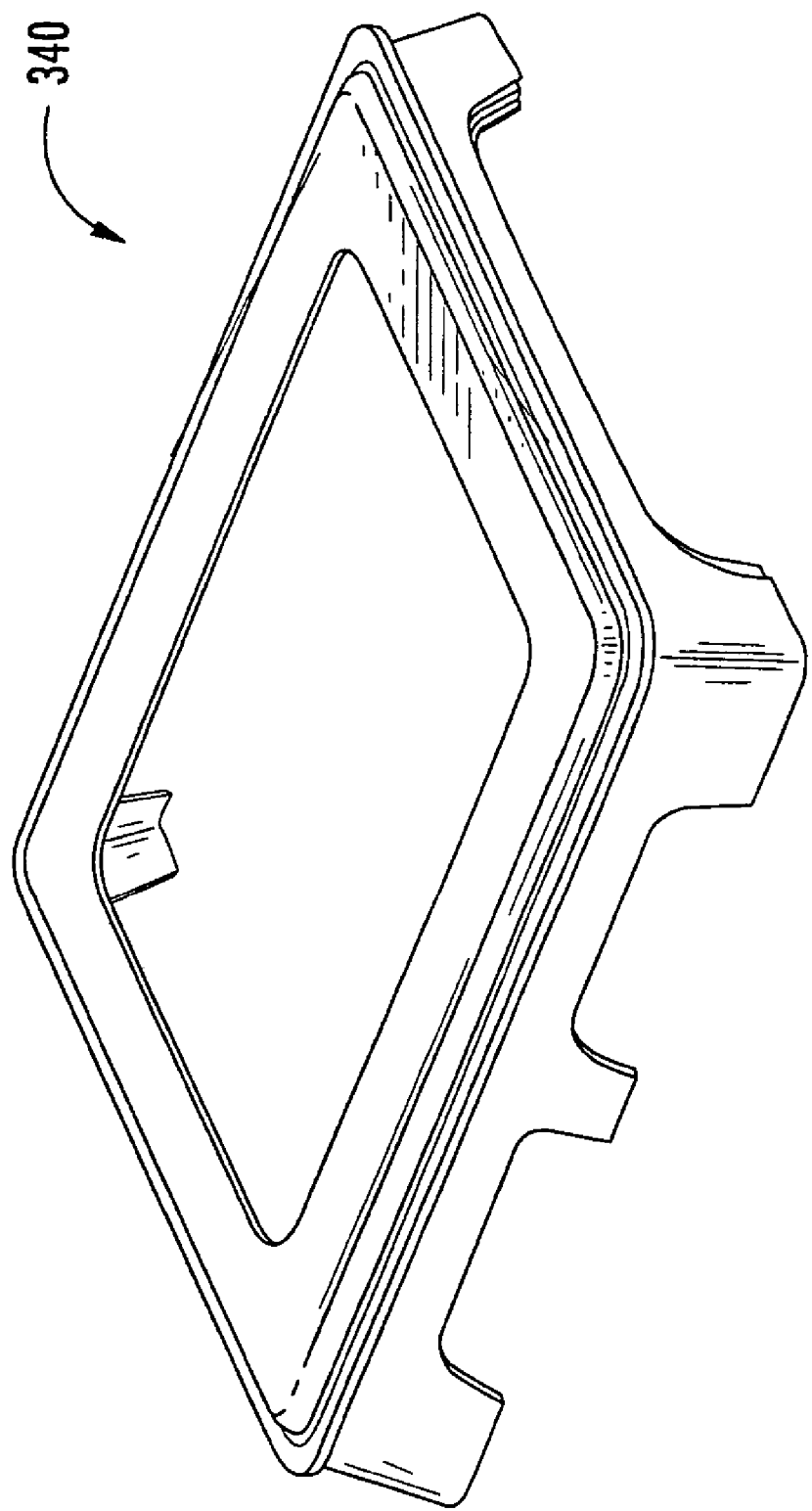
FIG. 9 is a rear perspective view of a replacement top section in accordance with further embodiments of the present invention.

According to further embodiments, a replacement top section 340 as shown in FIG. 9 may be joined to the bottom section 148 in place of the modified top section 240. The replacement top section 340 may have the same or similar configuration as the modified top section 240, but is formed (e.g., of FRP) in such configuration without requiring cutting and filling.

Figure 10:
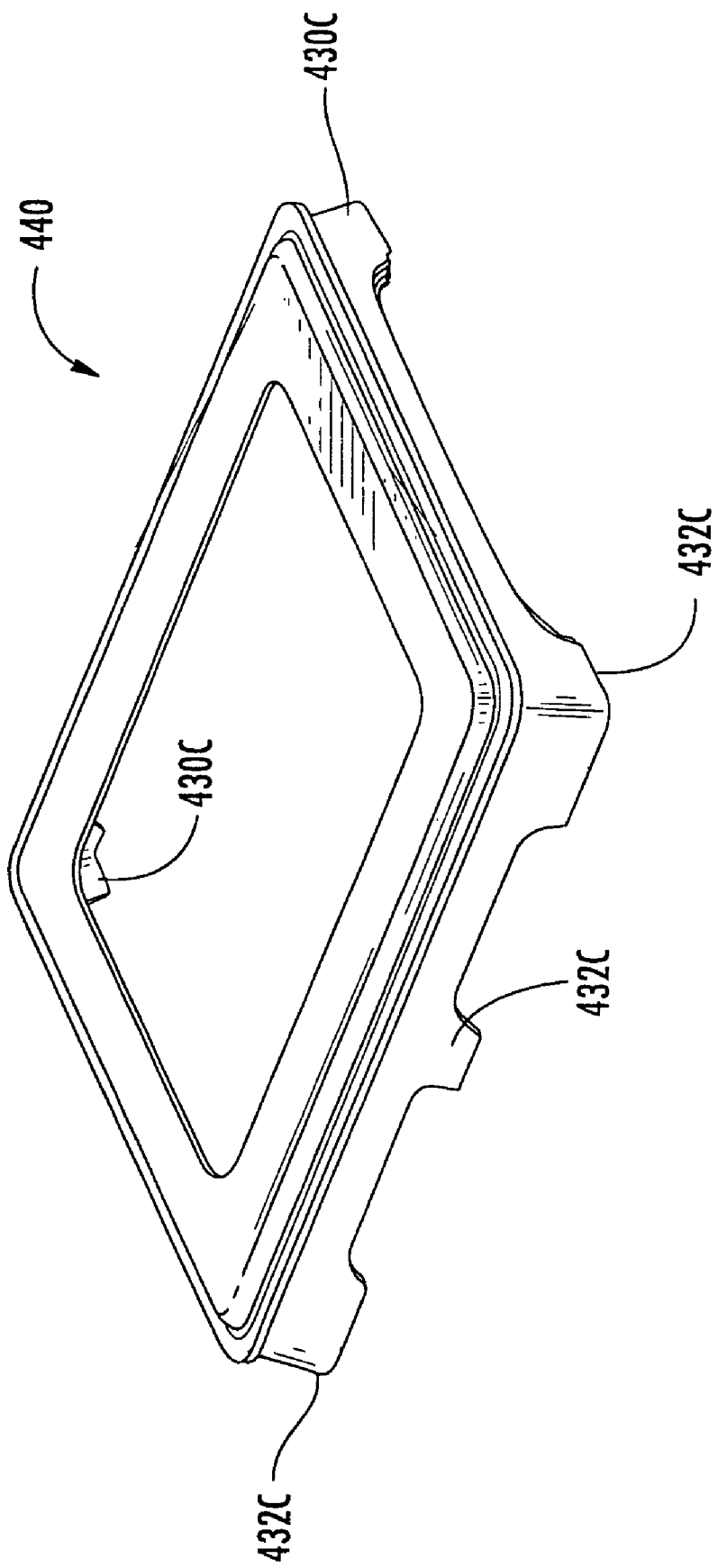
FIG. 10 is a rear perspective view of a replacement top section according to further embodiments of the present invention.
Figure 11:
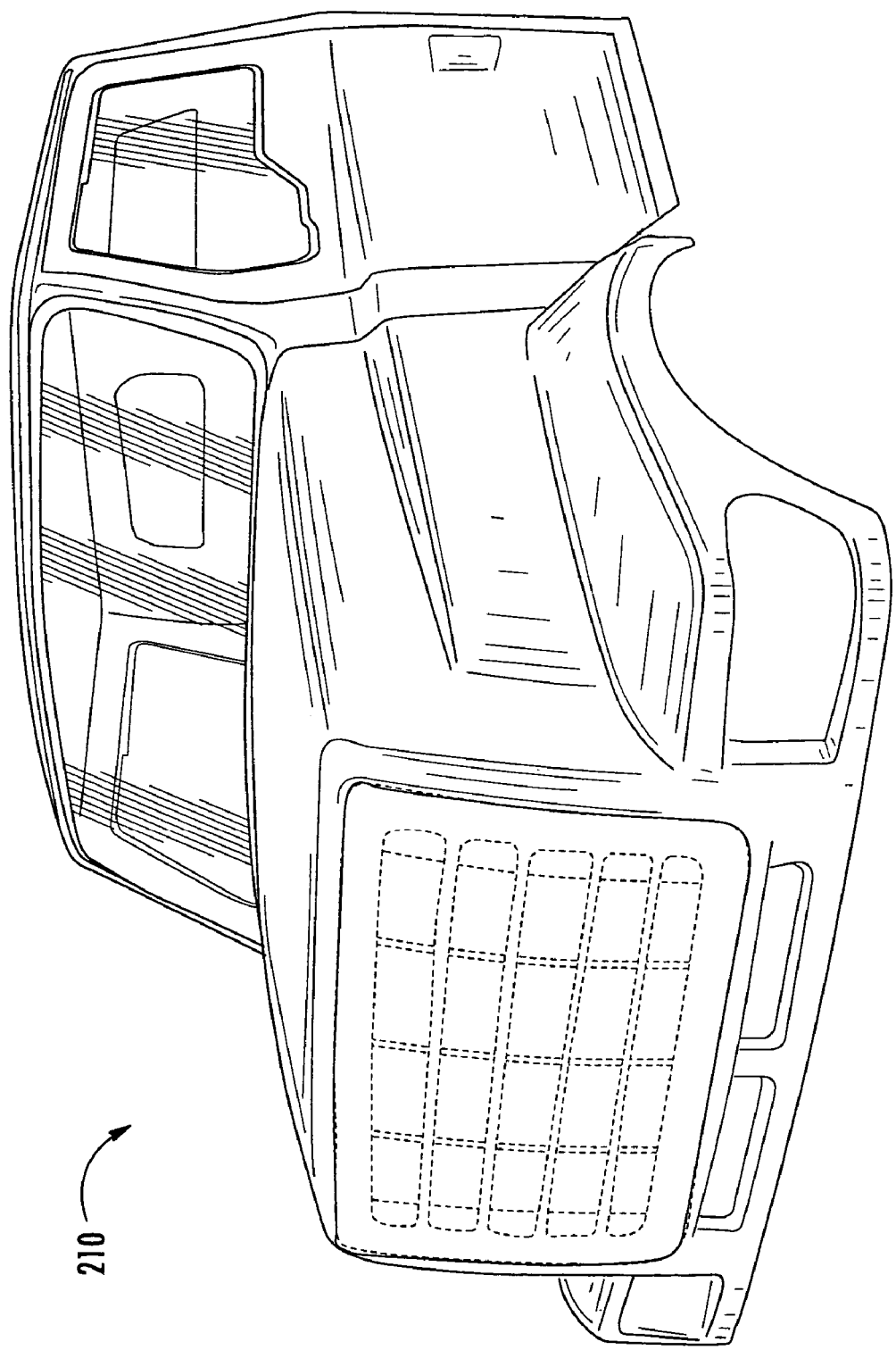
FIG. 11 is a perspective view of the modified cab of the truck of FIG. 2.
Figure 12:
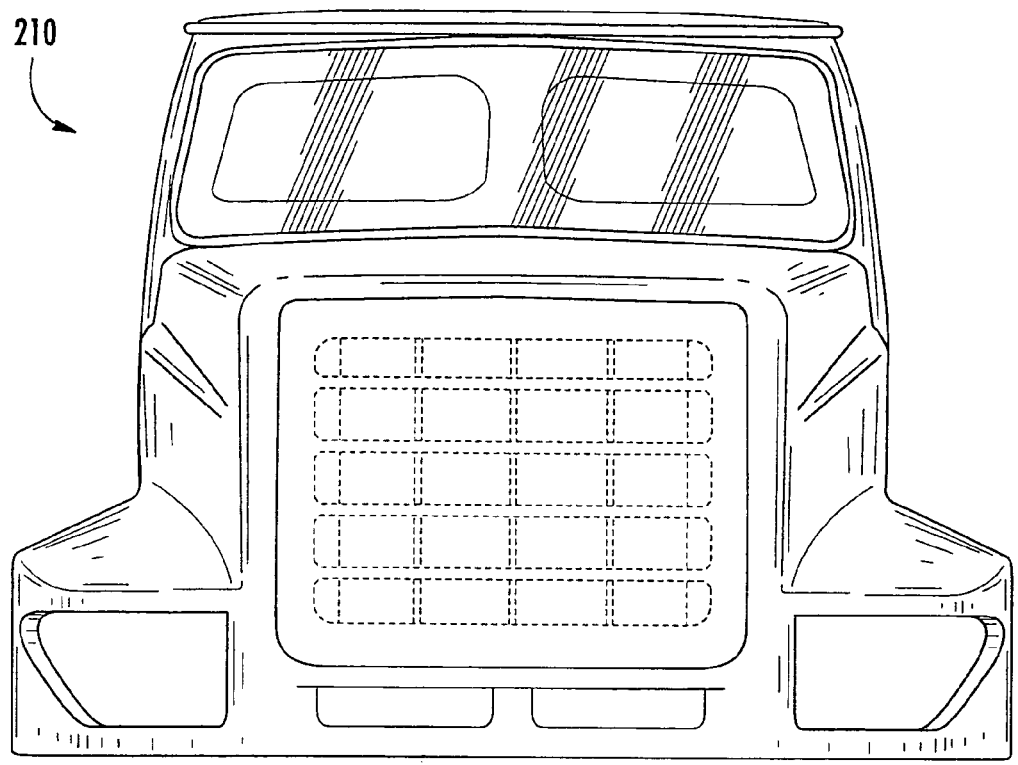
FIG. 12 is a front view of the modified cab of FIG. 11.
Figure 13:
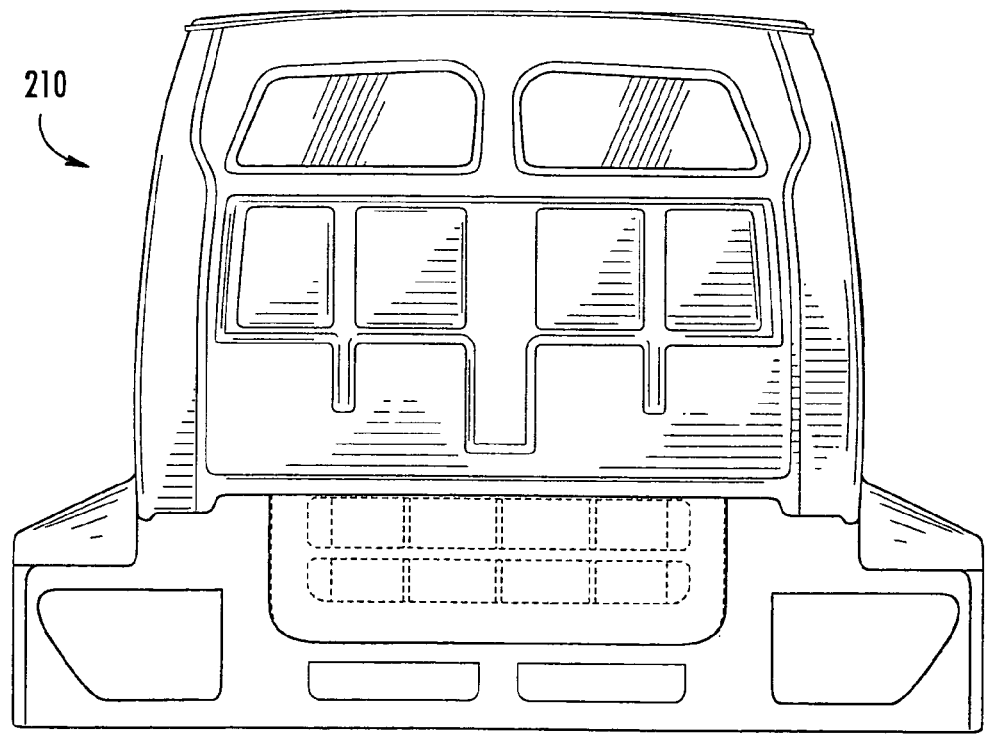
FIG. 13 is a rear view of the modified cab of FIG. 11.
Figure 14:
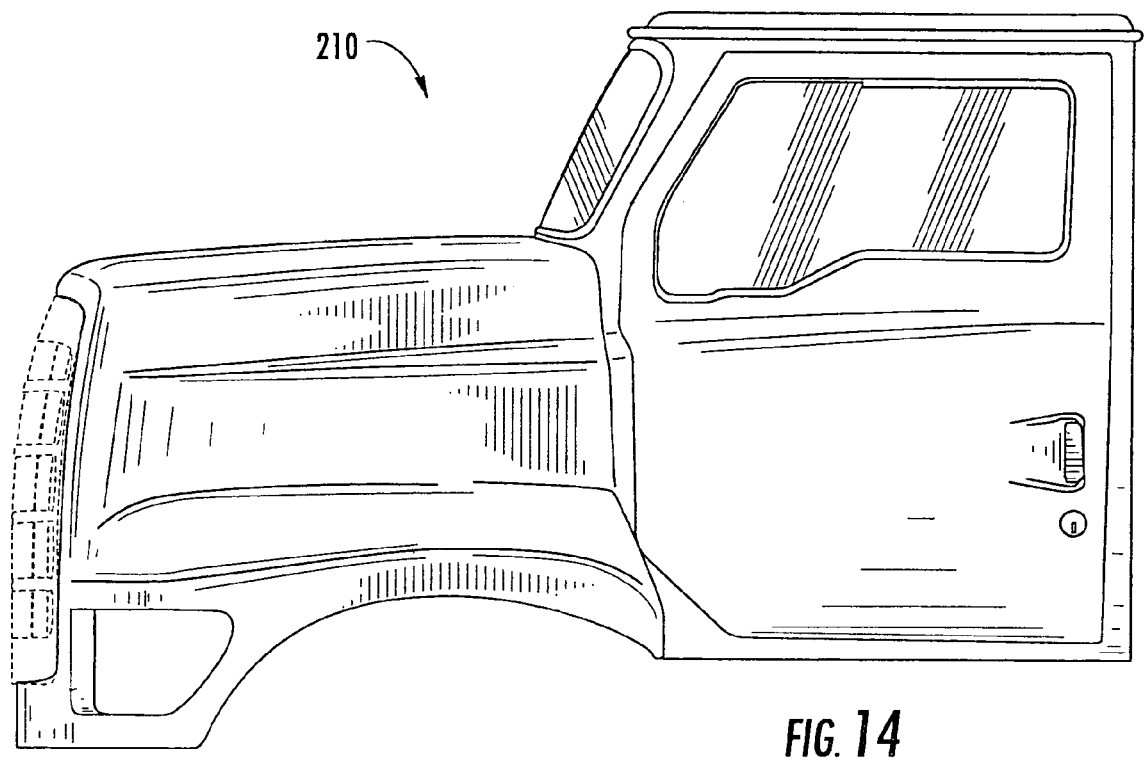
FIG. 14 is a right side view of the modified cab of FIG. 11.
Figure 15:
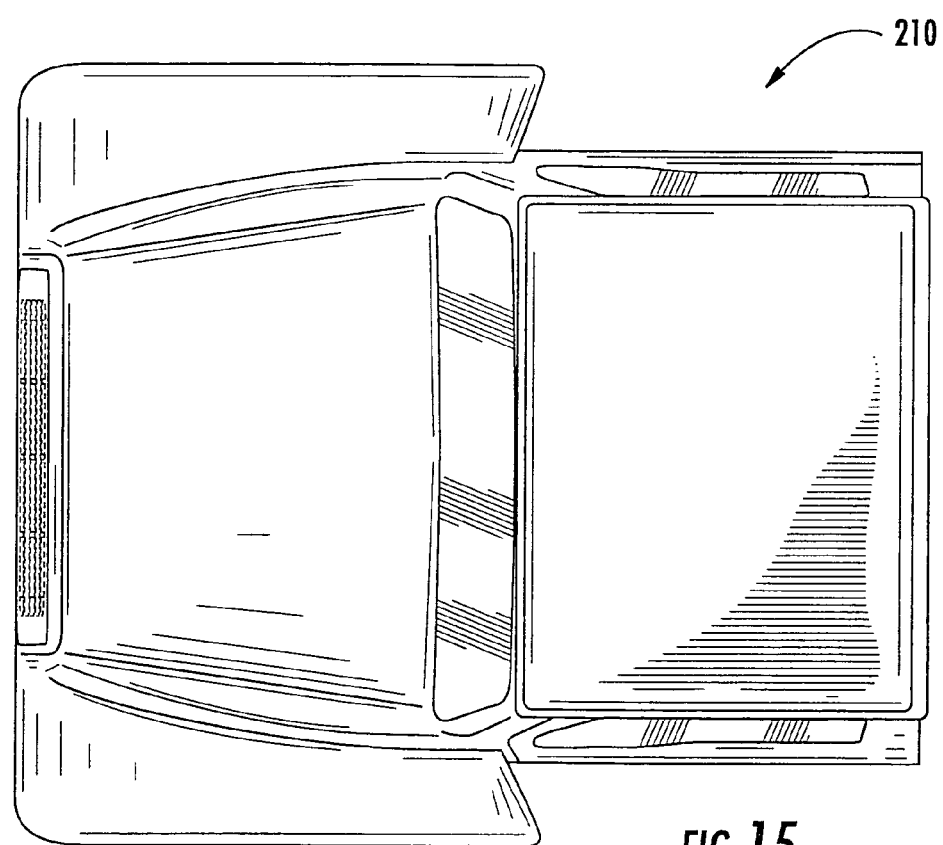
FIG. 15 is a top view of the modified cab of FIG. 11.

According to still further embodiments, an alternative replacement top section 440 as shown in FIG. 10 similar to that just described may be employed in place of the modified top section 240. The replacement top section 440 differs from the replacement top section 340 in that the post stubs 430C, 432C thereof are comparatively shorter (e.g., by the same amounts as described above with regard to the height H2 (FIG. 3C) of the removal sections 130A, 132A). In the case of the replacement top section 440, only a single cut line may be formed through the posts 130, 132 so that no removal sections are formed. Rather, the height of the cab is reduced by the reduced lengths of the post stubs 430C, 432C.

The methods, cab assemblies and doors disclosed herein may provide for functional and cost-effective reduction in the height of a truck cab. An enhanced height reduction may be achieved by chopping a cab in the window region and additionally lowering (i.e., reducing) the height of the top section (e.g., by reducing the height of a roof panel) as discussed above.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention. Therefore, it is to be understood that the foregoing is illustrative of the present invention and is not to be construed as limited to the specific embodiments disclosed, and that modifications to the disclosed embodiments, as well as other embodiments, are intended to be included within the scope of the invention.

That which is claimed is:

1. A method of modifying a cab assembly of a Class 5 or higher truck, the cab assembly including a cab, the cab having an original cab height from a cab bottom end to a cab top end thereof, the cab including a bottom region, a window region located above the bottom region, a roof region located above the window region, and a window defined in the window region, the method comprising:

cutting the cab through the window region to divide the cab into a top section and a bottom section; thereafter joining the top section or a replacement top section to the bottom section to form a modified cab, wherein the modified cab has a modified height from the cab bottom end to the cab top end that is less than the original cab height; and modifying a door of the cab assembly, the door having an original door height from a door bottom end to a door top end thereof, the door including a door bottom region, a door window region located above the door bottom region, a door top region located above the door window region, and a door window defined in the window region, wherein modifying the door includes:

cutting the door through the door window region to divide the door into a door top section and a door bottom section; and thereafter joining a replacement door member, which is not the door top section, to the door bottom section to form a modified door, wherein the modified door has a modified door height from the door bottom end to the door top end that is less than the original door height.

2. The method of claim 1 wherein joining the top section or a replacement top section to the bottom section to form a modified cab comprises joining the top section to the bottom section.

3. The method of claim 2 including:
cutting the cab through the window region to divide the cab into a removal section in the window region between the top section and the bottom section; and
removing the removal section from between the top and bottom sections prior to joining the top section or a further top section to the bottom section.

4. The method of claim 3 including removing a first roof portion from the top section and replacing the first roof portion with a second roof portion having a lower height than the first roof portion.

5. The method of claim 4 wherein the first roof portion is a first roof panel and the second roof section is a second roof panel.

6. The method of claim 2 further including cutting the top section and mounting at least one filler piece therein.

7. The method of claim 1 wherein joining the top section or a replacement top section to the bottom section to form a modified cab comprises joining a replacement top section directly to the bottom section.

8. The method of claim 7 wherein the replacement top section has a height that is less than a height of the top section of the original cab.

9. The method of claim 7 wherein the replacement top section is formed of fiberglass reinforced plastic (FRP).

10. The method of claim 1 wherein the modified cab height is between about 2 and 9 inches less than the original cab height.

11. The method of claim 1 wherein joining a replacement door member to the door bottom section includes mounting the replacement door member on the door bottom section such that a portion of the replacement door member vertically overlaps the door bottom section.

12. The method of claim 11 including mounting a second replacement door member on the door bottom section on a side thereof opposite the first replacement door member such that a lower portion of the second replacement door member vertically overlaps the door bottom section and an upper portion of the second replacement door member engages and is secured to an upper portion of the first replacement door member.

13. The method of claim 11 including bonding the replacement door member to the door bottom section with adhesive.

14. The method of claim 11 wherein the door bottom section and the replacement door member define a modified door window therebetween.

15. The method of claim 11 wherein the replacement door member is formed of fiberglass reinforced plastic (FRP).

16. The method of claim 11 wherein the replacement door member overlaps the door bottom section a distance of at least about 4 inches.

17. The method of claim 11 wherein:
cutting the door through the door window region includes forming the door bottom section to include upstanding front and rear post stubs;
the replacement door member includes front and rear extending portions; and
joining a replacement door member to the door bottom section includes mounting the replacement door member on the door bottom section such that the front and rear extending portions of the replacement door member vertically overlap the front and rear post stubs, respectively, of the door bottom section.

18. The method of claim 11 wherein the replacement door member is formed of a composite material.

19. The method of claim 1 wherein:
cutting the door through the door window region includes forming the door bottom section to include upstanding front and rear post stubs;
joining a replacement door member to the door bottom section to form a modified door comprises mounting a first replacement door member having first front and rear extending portions on the door bottom section such that the first front and rear extending portions of the first replacement door member vertically overlap the front and rear post stubs, respectively, of the door bottom section; and
the method further includes:
mounting a second replacement door member having second front and rear extending portions on the door bottom section on a side thereof opposite the first replacement door member such the second front and rear extending portions of the second replacement door member vertically overlap the front and rear post stubs, respectively, of the door bottom section and an upper portion of the second replacement door member engages and is secured to an upper portion of the first replacement door member; and
bonding the first and second replacement door members to the door bottom section with adhesive;
wherein the door bottom section and the first and second replacement door members define a modified door window therebetween; and
wherein the first and second replacement door members are formed of a composite material.

* * * * *